US012748852B2

(12) United States Patent
Kahan et al.

(10) Patent No.: US 12,748,852 B2
(45) Date of Patent: Sep. 29, 2026

(54) VULNERABILITY RISK PREDICTION ENGINE

(71) Applicant: CrowdStrike, Inc., Sunnyvale, CA (US)

(72) Inventors: Daniel Kahan, Culver City, CA (US); Adrian Bledea-Georgescu, Bucharest (RO); Cynthia Lai, Santa Clara, CA (US); Jeff Kaplan, Chagrin Falls, OH (US); Joe Faulhaber, Bozeman, MT (US); Anand Visvanathan, San Ramon, CA (US)

(73) Assignee: CrowdStrike, Inc., Sunnyvale, CA (US)

( * ) Notice: Subject to any disclaimer, the term of this patent is extended or adjusted under 35 U.S.C. 154(b) by 157 days.

(21) Appl. No.: 17/877,371

(22) Filed: Jul. 29, 2022

(65) Prior Publication Data

US 2024/0037245 A1 Feb. 1, 2024

(51) Int. Cl.
*G06F 21/57* (2013.01)
*H04L 9/40* (2022.01)

(52) U.S. Cl.
CPC ........ *G06F 21/577* (2013.01); *H04L 63/1433* (2013.01); *G06F 2221/034* (2013.01); *H04L 63/1416* (2013.01)

(58) Field of Classification Search
CPC ............. G06F 21/577; G06F 2221/034; H04L 63/1433
See application file for complete search history.

(56) References Cited

U.S. PATENT DOCUMENTS

2013/0055394 A1* 2/2013 Beresnevichiene ... G06F 21/577 726/25
2014/0201843 A1* 7/2014 Hibbert ............... H04L 63/1433 726/25

(Continued)

OTHER PUBLICATIONS

Zhao, J., Sun, H., & Cheng, Y. (2022). Attack Chains Construction Method Based on Vulnerabilities Combination. International Journal of Network Security, 24(3), 389-400. (Year: 2022).*

(Continued)

*Primary Examiner* — William R Korzuch
*Assistant Examiner* — Aditya Sriram
(74) *Attorney, Agent, or Firm* — Womble Bond Dickinson (US) LLP

(57) ABSTRACT

A system and method of predicting the probability of exploitation of vulnerabilities of a computing environment. The method includes acquiring one or more environment variables associated with a computing environment. The method includes identifying a vulnerability in the computing environment based on a vulnerability database (VDB) and the one or more environment variables associated with the computing environment. The method includes generating an input dataset based on behavioral-based endpoint detection and response (EDR) data associated with the vulnerability. The method includes providing the input dataset to one or more predictive models respectively trained to predict probabilities of exploitation of vulnerabilities of computing environments based on the input dataset. The method includes generating, by a processing device, a vulnerability risk score for the vulnerability of the computing environment based on the input dataset and the one or more predictive models.

20 Claims, 4 Drawing Sheets

(56) References Cited

U.S. PATENT DOCUMENTS

| | | | | |
|---|---|---|---|---|
| 2018/0034842 | A1 | 2/2018 | Smyth et al. | |
| 2020/0210590 | A1* | 7/2020 | Doyle | G06F 21/577 |
| 2021/0126936 | A1 | 4/2021 | Gerber, Jr. | |
| 2021/0312058 | A1 | 10/2021 | Chiarelli et al. | |
| 2022/0131887 | A1 | 4/2022 | Ngweta et al. | |
| 2022/0166783 | A1* | 5/2022 | Yavo | H04L 63/1425 |
| 2022/0191230 | A1* | 6/2022 | Morgan | H04L 63/20 |
| 2022/0207152 | A1 | 6/2022 | Bellis et al. | |
| 2022/0210202 | A1* | 6/2022 | Crabtree | G06F 21/577 |
| 2022/0232031 | A1* | 7/2022 | Bogren | H04L 63/102 |
| 2022/0318395 | A1* | 10/2022 | Janakiraman | G06F 21/577 |
| 2023/0336581 | A1* | 10/2023 | Dunn | G06F 21/577 |
| 2024/0193280 | A1* | 6/2024 | Reguly | G06F 17/11 |

OTHER PUBLICATIONS

"European Search Report" regarding Application No. 23178297.0, mailed May 27, 2025. pp. 1-6.

* cited by examiner

VULNERABILITY RISK PREDICTION ENGINE

TECHNICAL FIELD

The present disclosure relates generally to cyber security, and more particularly, to systems and methods for predicting the probability of exploitation of vulnerabilities of a computing environment using machine learning.

BACKGROUND

Cybersecurity is the practice of protecting critical systems and sensitive information from digital attacks. Cybersecurity techniques are designed to combat threats against networked systems and applications, whether those threats originate from inside or outside of an organization.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
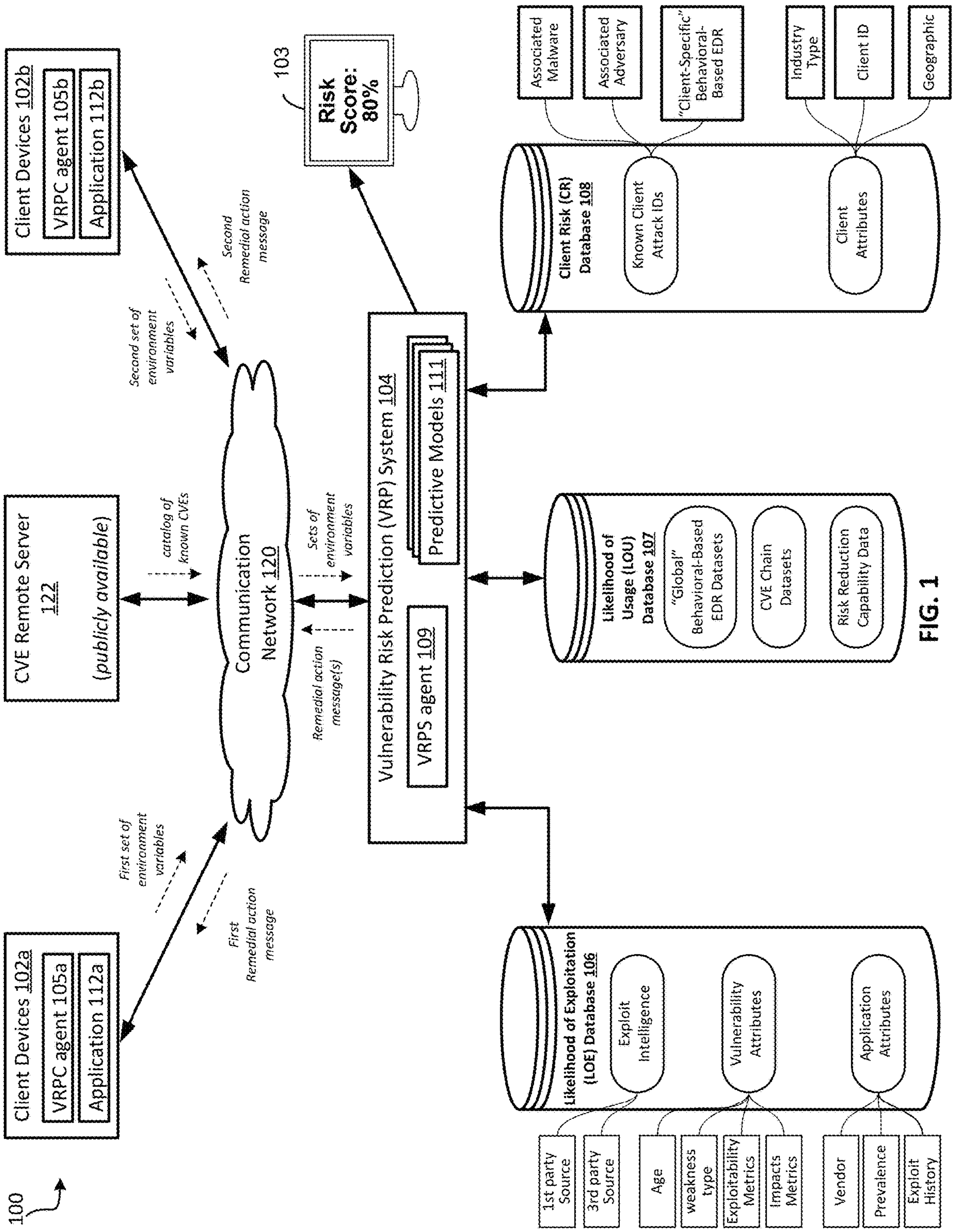
FIG. 1 is a block diagram depicting an example environment for predicting the probability of exploitation of vulnerabilities of a computing environment using machine learning, according to some embodiments.

Today a key concern for cybersecurity is exploits of software security vulnerabilities. A vulnerability is a way for existing software to be abused resulting in various negative effects, ranging from denial of the service provided by the software, tampering with its data, or even giving a malicious actor full remote control of a computer. In order to close these vulnerabilities, vendors supply updates (e.g., patches, code, etc.) to their software that remediate the vulnerability.

These software updates can also have negative effects, such as changing how the software works or even breaking major functionality. As a result, Information technology (IT) departments have learned to be careful and judicious about applying security updates, validating that they work as expected before deploying them to production systems, and trying them out on small sets of affected computers before broadcasting them to their full environments.

Furthermore, there are typically more updates to vulnerable software in a significant enterprise than is feasible to update. Some software is updated weekly or faster, leading to a bewildering array of potential risk to the enterprise that is nearly impossible to remediate. As a result, it is highly desirable to be able to prioritize the software updates to be applied for those with the highest risk of exploitation.

However, the current industry standard for vulnerability prioritization Common Vulnerability Scoring System (CVSS) is known to be a poor tool for vulnerability prioritization. For one, it assigns severities to vulnerabilities based on heuristically assigned weightings of attributes, instead of taking a data based approach. It is also static in nature, such that it unable to adequately adapt to changing exploit intelligence.

Attempts have been made at utilizing exploit intelligence to implement data based assessments of likelihood of exploit and risk, however these attempts have a number of limitations. Specifically, the conventional models are based on generalized exploit intelligence rather than intelligence that is specific to each client (e.g., customer). These conventional models also only strive to predict the likelihood that a vulnerability will be exploited "at least once," without considering the likely prevalence of that exploitation. In other words, even if a computing environment might have a vulnerability, it does not mean that a bad actor will exploit that vulnerability. Additionally, the conventional models do not account for the protections offered against some Common Vulnerabilities and Exposures (CVEs) by Next-Generation Antivirus (NGAV). Thus, there is a long-felt but unsolved need to solve the problems of determining how to prioritize the vulnerability remediation activities in a computing environment.

Aspects of the present disclosure address the above-noted and other deficiencies by predicting the probability of exploitation of vulnerabilities of a computing environment using machine learning. Benefits of the embodiments of the present disclosure may include a reduction in the amount of computing resources (e.g., memory resources, power resources, processing resources, networking resources) in a computing environment that would have been wasted if the attacks were continually allowed to exploit the vulnerabilities of the computing environment because the cyber security system failed to adequately prioritize the repairing of those vulnerabilities.

As discussed in greater detail below, a vulnerability risk prediction (VRP) system executes one or more predictive models that are each trained to predict probabilities of exploitation of vulnerabilities of computing environments based on an input dataset, and generate (e.g., predict) a vulnerability risk score that is indicative of how important a software update to resolve the vulnerability is relative to the others that are undeployed in the computing environment. Each predictive model is trained using training data that is indicative of at least one or more of the following: (1) one or more reported software vulnerabilities, (2) whether those vulnerabilities are known to be exploited, (3) the volume of exploits that have been attempted against that software, (4) local data about the deployment state of software in a single enterprise environment, and (5) the state of similar software in other enterprises in similar businesses.

The predictive models are configured to ingest the input dataset having one or more features. A feature may be first-party (e.g., related to the VRP system) and/or third-party (e.g., not related to the VRP system) exploit intelligence informing on the CVE's with proof-of-concept exploits, exploits in exploit frameworks, and exploits that have been observed being used in-the-wild. A feature may be behavioral-based endpoint detection and response (EDR) data identifying exploit type detections (e.g., patterns of software of behavior that indicate that an exploit has been used), and may include demographic data breaking down this information by client (e.g., customer) or client device (e.g., client device 102*a*, client device 102*b*), industry, and/or geography. A feature may indicate prevalence of software applications installed across clients, and may include demographic data breaking down this information by client or client device, industry, and/or geography.

The vulnerability risk score is a prediction of the probability of the vulnerability being exploited against a specific computing device (e.g., host system, client device) at a specific company accounting for its demographics. The predictive model takes EDR detections of exploit type behavior and group them by software application and application version involved in the detection. The predictive model calculates a detection rate for each application time over various time horizons by dividing the detections for each application and application versions by the prevalence software in client environments. The predictive model, which is configured to use machine learning techniques, utilizes historical exploit and threat intelligence as well as the observed exploit intensity (e.g., detection rate) of the application associated with the CVE derived from step 1 to create a prediction model for the likelihood of exploitation of for the CVE against a specific host. The predictive model assigns a rating to CVE's based on the resulting probability of exploitation.

In an illustrative embodiment, a VRP system acquires one or more environment variables associated with a computing environment. The VRP system identifies a vulnerability in the computing environment based on a vulnerability database (VDB) and the one or more environment variables associated with the computing environment. The VRP system generates an input dataset based on behavioral-based endpoint detection and response (EDR) data associated with the vulnerability. The VRP system provides the input dataset to one or more predictive models respectively trained to predict probabilities of exploitation of vulnerabilities of computing environments based on the input dataset. The VRP system generates a vulnerability risk score for the vulnerability of the computing environment based on the input dataset and the one or more predictive models.

FIG. 1 is a block diagram depicting an example environment for predicting the probability of exploitation of vulnerabilities of a computing environment using machine learning, according to some embodiments. The environment 100 includes a VRP system 104, a (CVE) remote server 122, and one or more client devices 102 (e.g., client devices 102*a*, 102*b*) that are each communicably coupled together via a communication network 120. The environment 100 includes a likelihood of exploitation (LOE) database 106, a likelihood of usage (LOU) database 107, and a historical client risk (HCR) database 108 that are communicably coupled to the VRP system 104. The VRP system 104 locally stores and/or executes a vulnerability risk prediction service (VRPS) agent 109. The VRP system 104 locally stores and/or executes one or more predictive models 111 that are each trained to ingest an input dataset and predict probabilities of exploitation of vulnerabilities of computing environments based on the input dataset. Each of the one or more client devices 102 locally stores and/or executes a vulnerability risk prediction client (VRPC) agent 109.

The communication network 120 may be a public network (e.g., the internet), a private network (e.g., a local area network (LAN) or wide area network (WAN)), or a combination thereof. In one embodiment, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g. cell towers), etc. The communication network 120 may carry communications (e.g., data, message, packets, frames, etc.) between any other the computing device.

The CVE remote server 122 (sometimes referred to as, "vulnerability database") is configured to store a catalog (e.g., plurality, list) of CVE identifiers (IDs) that each refer to a known cybersecurity threat (sometimes referred to as, "vulnerability"). This publicly available catalog divides the threats into two categories: vulnerabilities and exposures. A vulnerability is a mistake in software code that provides an attacker with direct access to a system or network. For example, the vulnerability may allow an attacker to pose as a superuser or system administrator who has full (or elevated) access privileges. An exposure, on the other hand, is defined as a mistake in software code or configuration that provides an attacker with indirect access to a system or network. For example, an exposure may allow an attacker to secretly gather client information that could be sold. The catalog's main purpose is to standardize the way each known vulnerability or exposure is identified. This is important because standard CVE IDs allow security administrators to quickly access technical information about a specific threat across multiple CVE-compatible information sources.

The LOE database 106 is configured to store exploit intelligence (sometimes referred to as, "historical CVEs"). The LOE database 106 may receive the exploit intelligence from 1st party sources (e.g., private repositories), which may include behavioral detections, overwatch detections (e.g., details about suspicious activity in a customer's organization), and incident response services. The LOE database 106 may receive the exploit intelligence from 3rd party sources (e.g., public repositories), which may include public and private proof-of-concept exploits, exploit frameworks, exploit kits, and information discussed on social media or the dark web (e.g., hidden collective of internet sites only accessible by a specialized web browser).

The LOE database 106 is configured to store vulnerability attributes. A vulnerability attribute may be an age of the vulnerability, which indicates how long the vulnerability has been publicly known. A vulnerability attribute may be a weakness type (e.g., Common Weakness Enumeration (CWE)), which indicates if the vulnerability is related to hardware (e.g., processor, memory, storage) and/or software (e.g., application, drivers). A vulnerability attribute may be an exploitability metric that indicates the exploit complexity (e.g., low complexity, high complexity), whether the vulnerability is exploitable over the network, or whether the vulnerability requires local access to a computing device. A vulnerability attribute may be an impact metric that indicates the degree of usefulness would be in an attack if the vulnerability were exploited in the attack. For example, whether valuable (e.g., system information, private information) could be exposed to an attacker if the vulnerability was exploited, or whether user privileges in the computing environment could be escalated if the vulnerability was exploited.

The LOE database 106 is configured to store application attributes about a plurality of applications. An application attribute may indicate if the vendor associated with an application has a history of being exploited. An application attribute may indicate whether an application is prevalent in a particular computing environment. An application attribute may indicate whether an application type (e.g., word processing, spreadsheet, operating system) or a particular application (e.g., Microsoft® Word, Microsoft® Excel, Microsoft® Windows) has a history of being exploited. An application attribute may indicate a frequency in which a particular application is updated by the developer to patch security holes. An application attribute may indicate whether a particular application is likely to be used in a computing environment (e.g., corporate environment) where the network administrator has a history of delaying software updates.

The LOU database 107 is configured to store global behavioral-based endpoint detection and response (EDR) dataset identifying exploit type detections (e.g., patterns of software of behavior that indicate that an exploit has been used), and may include demographic data breaking down the global EDR dataset by client (e.g., computing environment), industry, and/or geography. The EDR dataset are considered "global" because it is collected from a plurality of computing environments that each execute an EDR endpoint security solution that continuously monitors (in real-time) end-user devices in the computing environment to detect and respond to cyber threats like ransomware and malware. An EDR endpoint security solution records and stores endpoint-system-level behaviors, uses various data analytics techniques to detect suspicious system behavior, provides contextual information, blocks malicious activity, and provides remediation suggestions to restore affected systems. That is, an EDR endpoint security solution records the activities and events taking place on endpoints and all workloads as EDR datasets, which provide visibility needed to uncover incidents that would otherwise remain invisible.

The LOU database 107 is configured to store CVE chain datasets, where each CVE chain dataset indicates a likelihood that a combination of CVEs (e.g., vulnerabilities) could be used together in an attack. For example, a CVE dataset may indicate that if a computing environment is associated with CVE #1 (e.g., indicating a vulnerability with an operating system) and CVE #2 (e.g., indicating a vulnerability with an application that executes on the operating system), then there is a 60% chance that a bad actor might exploit both CVE #1 and CVE #2 in an attack. As another example, a CVE dataset may indicate that if a computing environment is associated with CVE #1 and CVE #3 (e.g., indicating a vulnerability with a software driver that executes on the operating system), then there is a 90% chance that a bad actor might exploit both CVE #1 and CVE #3 together in an attack.

The LOU database 107 is configured to store risk reduction capability datasets. Each risk reduction capability dataset indicates a likelihood for a computing environment to defend against attacks that utilize a particular vulnerability. For example, a risk reduction capability dataset may indicate that if a computing environment (e.g., client device 102*a*, client device 102*b*) has a particular anti-virus software (e.g., a particular brand, a particular version of the particular brand, a particular database version) having a particular detection capability (e.g., static signature-based detection, EDR detection, NGAV detection) then the computing environment has a 60% chance of defending against an attack that exploits CVE #1 and a 40% chance of defending against an attack that exploits CVE #2 in an attack. As another example, a risk reduction capability dataset may indicate that if a computing environment has a particular anti-virus software then the computing environment has a 50% chance of defending against an attack that exploits both CVE #1 and CVE #3 together in an attack.

The CR database 108 is configured to store known client attacked identifiers (IDs), where each known client attack ID corresponds to one or more attacks that have occurred in the client's computing environment. For example, a known client attack ID may indicate that a particular malware had previously attacked the client's computing environment by exploiting a particular set (e.g., one or more) of CVEs in the client's computing environment. As another example, a known client attack ID may indicate that a particular adversary had previously attacked the client's computing environment by exploiting a particular set of CVEs in the client's computing environment. As another example, a known client attack ID may be client-specific behavioral-based endpoint detection and response (EDR) dataset identifying exploit type detections, and may include demographic data breaking down the global EDR dataset by industry and/or geography. The EDR dataset are considered "client-specific" because it is collected from the computing environments that are associated with a specific client, where each of the client's computing environment executes an EDR endpoint security solution that continuously monitors (in real-time) end-user devices in the computing environment to detect and respond to cyber threats like ransomware and malware.

The CR database 108 is configured to store a plurality of client attributes and a plurality of client IDs, where each client ID is associated with one or more client attributes. In some embodiments, the client ID may correspond to a specific client device 102. For example, client ID #1 may correspond to client device 102*a*, and client ID #2 may correspond to client device 102*b*. Therefore, client ID #1 is associated (e.g., linked) in the CR database 108 to the client attributes of client device 102*a*, and client ID #2 is associated in the CR database 108 to the client attributes of client device 102*ba*.

In some embodiments, the client ID may correspond to a specific client (e.g., a person or an organization) associated with a particular type of network, where one or more client devices 102 are connected to the network. For example, communication network 120 may be a corporate network that is managed by a technology client. Therefore, the client ID #1 that corresponds to the technology client is associated in the CR database 108 to the client attributes of both client device 102*a* and client device 102*b*. As another example, communication network 120 may be a local network at a person's residence. Therefore, the client ID #2 that corresponds to the person is associated in the CR database 108 to the client attributes of client device 102*a* and client device 102*b*. In some embodiments, a client attribute may indicate that a particular client is associated with one or more industries (e.g., raw material, manufacturing and construction, foodservice, information services, technology), a network type (e.g., corporate, local/residential), and/or one or more geographic locations (e.g., city, state, country).

As used herein, a computing environment refers to the computing resources of a computing device that are involved in the execution of an application. For example, when client device 102*a* executes the application 112*a* on its processing device, then the computing environment refers to the hardware (e.g., processing device, data storage, memory, etc.) and/or software (e.g., applications, operating systems, drivers) of the client device 102*a* that the client device 102*a* uses to execute the application 112*a*. As another example, when client device 102*b* executes the application 112*b* on its processing device, then the computing environment refers to the hardware and/or software of the client device 102*b* that the client device 102*b* uses to execute the application 112*b*. Any of the software and hardware used to execute the application may include one or more vulnerabilities (as could the application itself) that an attacker may exploit to gain unauthorized access to the computing environment. In some embodiments, communication network 120 may be a corporate network associated with an organization, where several client devices (e.g., client device 102*a*, client device 102*b*, etc.) are connected to the corporate network. Therefore, the computing environment may refer to the computing resources of a single client device (e.g., client device 102*a*) that is connected to the corporate network, or of all of the client devices (e.g., client device 102*a* and client device 102*b*) that are connected to the corporate network.

Example vulnerabilities include missing data encryption, operating system (OS) command injection, structured query language (SQL) injection, buffer overflow, missing authentication for critical function, missing authorization, unrestricted upload of dangerous file types, reliance on untrusted inputs in a security decision, and so on.

Still referring to FIG. 1, the VRP system 104 executes a VRPS agent 109 that is configured to perform a series of operations (e.g., processes, tasks, actions) using the one or more predictive models 111 that execute on the VRP system 104. These series of operations are categorized into two phases: a "Training Phase" for training the predictive models 111 and a "Management Phase" for managing and/or using the predictive models 111, once trained. During the Training Phase, the VRPS agent 109 trains (e.g., creates, builds, programs, etc.) each of the predictive models 111 using a training dataset such that the predictive models 111 can predict probabilities of exploitation of vulnerabilities of computing environments based on an input dataset, and then generate vulnerability risk scores. The VRPS agent 109 generates the training dataset using any combination of the datasets (including attributes, metrics, etc.) that are stored on LOE database 106, LOU database 107, and/or CR database 108. The vulnerability risk score indicates the probability that an attacker would exploit one or more vulnerabilities of a particular computing environment in order to attack the computing environment.

The VRPS agent 109 deploys ("bring on-line") the now-trained, predictive models 111 into a production environment, such that the predictive models 111 may each be relied on (together or separately/independently) by an administrator of the VRP system 104 for the purpose of predicting and/or resolving (e.g., mitigating, preventing, etc.) probabilities of exploitation of vulnerabilities of computing environments. The VRPS agent 109 deploys one or more of the predictive models 111 into a production environment by executing (e.g., running) one or more of the predictive models 111 on the VRP system 104, or on a remote computing system (e.g., a cloud computing network).

During the Management phase, VRPS agent 109 may receive a set of environment variables from a computing device, where the environment variables describe the software and hardware capabilities of the computing device. For example, the VRPS agent 109 may receive environment variables (shown in FIG. 1 as, "first set of environment variables") from client device 102*a* and/or environment variables (shown in FIG. 1 as, "second set of environment variables") from client device 102*b*. The first set of environment variables may indicate that client device 102*a* is executing application 112*a*, which is a first type of operating system (e.g., Microsoft® Windows). The second set of environment variables may indicate that client device 102*b* is executing application 112*b*, which is a second type of operating system (e.g., Linux®). The environment variables may also indicate the type (e.g., private, public, corporate, non-corporate) of network that is connected to the computing device. For example, the first set of environment variables may indicate that client device 102*a* is connected to a corporate network, and the second set of environment variables may indicate that client device 102*b* is connected to a non-corporate, residential network.

The VRPS agent 109 identifies one or more vulnerabilities in the computing environment (e.g., client device 102*a*) based on the one or more environment variables that are associated with the computing environment. For example, the first set of environment variables that are received from the client device 102*a* may indicate that client device 102*a* is executing application 112*a* (e.g., Microsoft® Windows 10). The VRPS agent 109 might determine that application 112*a* is associated with a known vulnerability by comparing an identifier of the application 112*a* against the catalog of known CVEs (as shown in FIG. 1), which the VRPS agent 109 acquired from the CVE remote server 122. If the identifier of the application 112*a* matches a particular application identifier in the catalog, then the VRPS agent 109 determines that the application 112*a* has the one or more vulnerabilities (e.g., known CVEs) that are linked to the application identifier in the catalog.

The VRPS agent 109 generates the input dataset using any combination of the datasets (including attributes, metrics, etc.) that are stored on LOE database 106, LOU database 107, and/or CR database 108. In some embodiments, the datasets stored in the databases have been updated after the VRPS agent 109 deployed the trained, predictive models 111 into a production environment. As such, the input dataset is different than the training dataset that were used to train the predictive models 111. For example, the input dataset may include EDR data that is specifically associated with the vulnerability of application 112*a*.

The VRPS agent 109 provides the input dataset to the predictive models 111 to cause the predictive models 111 to ingest the input dataset, and generate a vulnerability risk score for the known vulnerability of application 112*a* based on the input dataset. Using the vulnerability risk score, the VRPS agent 109 may then prioritize the known vulnerability of application 112*a* over vulnerabilities that are associated with other applications executing on the computing environment (e.g., client device 102*a*) and/or other computing environments (e.g., client device 102*b*). The VRPS agent 109 sends a message (shown in FIG. 1 as, "first remedial message") to client device 102*a* indicating one or more remedial actions to resolve or mitigate the vulnerability. The message may include instructions that cause the client device 102*a* to install software updates that resolve or mitigate the vulnerability. The VRPS agent 109 may cause the risk score and/or the one or more remedial actions to be presented on a computer display 103.

Although FIG. 1 shows only a select number of computing devices (e.g., VRP system 104, client devices 102, CVE remote server 122), and databases (e.g., LOE database 106, LOU database 107, CR database 108); the environment 100 may include any number of computing devices and/or databases that are interconnected in any arrangement to facilitate the exchange of data between the computing devices.

Figure 2A:
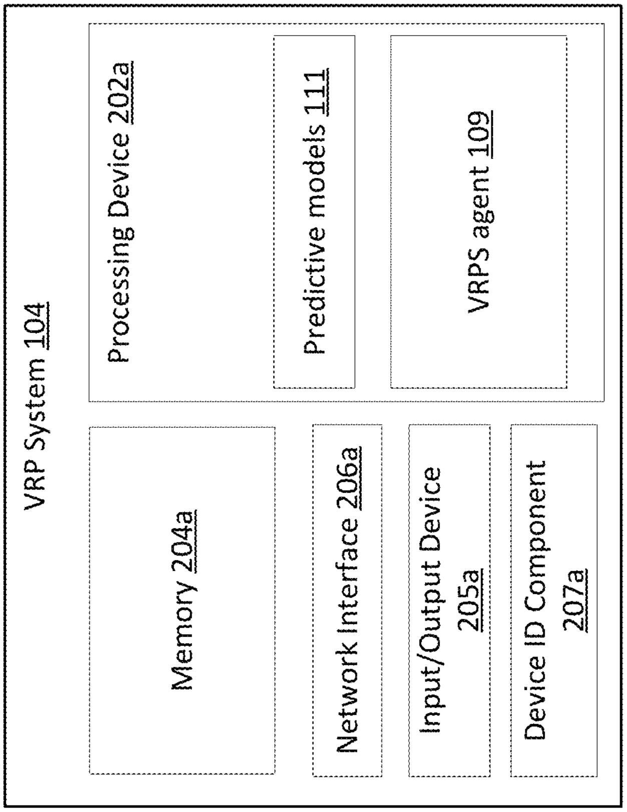
FIG. 2A is a block diagram depicting an example of the vulnerability risk prediction (VRP) system 104 in FIG. 1, according to some embodiments.

FIG. 2A is a block diagram depicting an example of the vulnerability risk prediction (VRP) system 104 in FIG. 1, according to some embodiments. While various devices, interfaces, and logic with particular functionality are shown, it should be understood that the VRP system 104 includes any number of devices and/or components, interfaces, and logic for facilitating the functions described herein. For example, the activities of multiple devices may be combined as a single device and implemented on a same processing device (e.g., processing device 202*a*), as additional devices and/or components with additional functionality are included.

The VRP system 104 includes a processing device 202*a* (e.g., general purpose processor, a PLD, etc.), which may be composed of one or more processors, and a memory 204*a* (e.g., synchronous dynamic random access memory (DRAM), read-only memory (ROM)), which may communicate with each other via a bus (not shown).

The processing device 202*a* may be provided by one or more general-purpose processing devices such as a microprocessor, central processing unit, or the like. In some embodiments, processing device 202*a* may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202*a* may comprise one or more special-purpose processing devices such as an application specific integrated circuit (ASIC), a field programmable gate array (FPGA), a digital signal processor (DSP), network processor, or the like. The processing device 202*a* may be configured to execute the operations described herein, in accordance with one or more aspects of the present disclosure, for performing the operations and steps discussed herein.

The memory 204*a* (e.g., Random Access Memory (RAM), Read-Only Memory (ROM), Non-volatile RAM (NVRAM), Flash Memory, hard disk storage, optical media, etc.) of processing device 202*a* stores data and/or computer instructions/code for facilitating at least some of the various processes described herein. The memory 204*a* includes tangible, non-transient volatile memory, or non-volatile memory. The memory 204*a* stores programming logic (e.g., instructions/code) that, when executed by the processing device 202*a*, controls the operations of the VRP system 104. In some embodiments, the processing device 202*a* and the memory 204*a* form various processing devices and/or circuits described with respect to the VRP system 104. The instructions include code from any suitable computer programming language such as, but not limited to, C, C++, C #, Java, JavaScript, VBScript, Perl, HTML, XML, Python, TCL, and Basic.

The processing device 202*a* may be configured to execute the vulnerability risk prediction service (VRPS) agent 109. The VRPS agent 109 may be configured to train each of the predictive models 111 using a training dataset to predict probabilities of exploitation of vulnerabilities of computing environments based on input dataset, and generate a vulnerability risk score that is indicative of how important a software update to resolve the vulnerability is relative to the others that are undeployed in the computing environment. The VRPS agent 109 may be configured to generate the training dataset using any combination of the datasets (including attributes, metrics, etc.) that are stored on LOE database 106, LOU database 107, and/or CR database 108. The vulnerability risk score indicates the probability that an attacker would exploit one or more vulnerabilities of a particular computing environment in order to attack the computing environment.

The VRPS agent 109 may be configured to deploy the one or more of the predictive models 111 into a production environment by executing (e.g., running) one or more of the predictive models 111 on the processing device 202*a* of the VRP system 104, or on a remote computing system (e.g., a cloud computing network).

The VRPS agent 109 may be configured to acquire one or more environment variables associated with a computing environment. The VRPS agent 109 may be configured to identify a vulnerability in the computing environment based on a vulnerability database (VDB) and the one or more environment variables associated with the computing environment. The VRPS agent 109 may be configured to generate an input dataset based on behavioral-based endpoint detection and response (EDR) data associated with the vulnerability. The VRPS agent 109 may be configured to provide the input dataset to the one or more predictive models 111.

The predictive model 111 may be configured (e.g., trained) to generate a vulnerability risk score for a vulnerability of a computing environment based on ingesting the input dataset. The predictive model 111 may be configured to generate a vulnerability risk score by determining a likelihood of the vulnerability being exploited at least once (e.g., within the client's computing environment, or any other computing environment) in an attack based on one or more historical CVE attributes (e.g., exploit intelligence in FIG. 1), one or more application attributes of an application associated with the vulnerability, and/or one or more vulnerability attributes of the vulnerability in the computing environment.

In some embodiments, the predictive model 111 may be configured to determine a likelihood of the vulnerability being exploited at least once based on one or more historical CVE attributes by identifying similarities between applications. For example, the first set of environment variables that are received from the client device 102*a* may indicate that client device 102*a* is executing application 112*a* (e.g., Microsoft® Windows 10). The VRPS agent 109 might determine that application 112*a* is associated with a known vulnerability by comparing an identifier of the application 112*a* against the catalog of known CVEs (as shown in FIG. 1), which the VRPS agent 109 acquired from the CVE remote server 122. The VRPS agent 109 may provide the identifier of the application 112*a* and the catalog of known CVEs to the predictive model 111 as part of the input date. If the predictive model 111 determines that the application 112*a* is similar (e.g., similar functionality, similar type of program) to a particular application identifier in the catalog, then the predictive model 111 may determine that the application 112*a* has the same known vulnerability as the particular application. As such, the predictive model 111 may determine that the likelihood of the vulnerability being exploited in the application 112*a* is similar to the likelihood of the vulnerability being exploited in the particular application.

In some embodiments, the application attributes may indicate an attack history of the application. If the predictive model 111 determines that the attack history indicates that the number of historical attacks exceed a predefined threshold value (e.g., 2 attacks, 10 attacks), then the predictive model 111 determines that there is a high likelihood of the vulnerability being exploited at least once; otherwise it determines there is a low likelihood of exploitation.

In some embodiments, the application attributes may indicate an attack history of other applications associated with a vendor of the application being exploited in the attack. If the predictive model 111 determines that the attack history of other applications (e.g., a spreadsheet program, a photo editing program) associated with a vendor of the application (e.g., a word processing program) indicates that the number of historical attacks exceed a predefined threshold value, then the predictive model 111 determines that there is a high likelihood of the vulnerability being exploited at least once; otherwise it determines there is a low likelihood of exploitation.

In some embodiments, the application attributes may include prevalence data indicating whether a particular application is prevalent among a plurality of computing devices in the computing environment. If the predictive model 111 determines that a majority of the client devices 102 that are connected to communication network 120 are executing the same application (e.g., application 112) and the application has at least one vulnerability, then the predictive model 111 may determine that there is a high likelihood of the vulnerability being exploited at least once because the vulnerability is prevalent in the computing environment; otherwise it determines there is a low likelihood of exploitation.

In some embodiments, the vulnerability attributes of the vulnerability in the computing environment are indicative of at least one of a weakness category associated with the vulnerability being exploited. If the predictive model 111 determines that the weakness category exposes critical regions (e.g., system files, administration privileges) of a computing device or operating system executing on the computing device, then the predictive model 111 may determine that there is a high likelihood of the vulnerability being exploited at least once; otherwise it determines there is a low likelihood of exploitation.

In some embodiments, the vulnerability attributes of the vulnerability in the computing environment are indicative of a usefulness score associated with the vulnerability being exploited. If the predictive model 111 determines that the usefulness score indicates that exploitation of the vulnerability would give an attack useful control over a computing device in the computing environment, then the predictive model 111 may determine that there is a high likelihood of the vulnerability being exploited at least once; otherwise it determines there is a low likelihood of exploitation.

In some embodiments, the vulnerability attributes of the vulnerability in the computing environment include a vulnerability age indicating when the vulnerability initially appeared in other computing environments prior to being identified in the computing environment. If the predictive model 111 determines that the vulnerability has been known for a long time (e.g., by comparing to a predetermine threshold), then the predictive model 111 determines that there is a low likelihood of the vulnerability being exploited at least once; otherwise it determines there is a high likelihood of exploitation because attackers would want to exploit new vulnerabilities that are not known and undetectable by antivirus software.

In some embodiments, the EDR data may be considered "global" EDR data (as discussed herein), such that it is associated with more than one computing environment. In this embodiment, the predictive model 111 may be configured to generate the vulnerability risk score by calculating, based on the global EDR data, a frequency in which the vulnerability might be exploited. For example, the predictive model 111 may determine that the vulnerability is likely to be exploited 2 times in a first computing environment (where the EDR systems in the first computing environment would be able to detect the exploitation of the vulnerability in the first computing environment) and exploited 5 times in a second computing environment (where the EDR systems in the second computing environment would be able to detect the exploitation of the vulnerability in the second computing environment). If the predictive model 111 determines that the total frequency (e.g., 7 times) that the vulnerability is exploited in both computing environments exceed a predefined threshold value, then the predictive model 111 determines that there is a high likelihood of the vulnerability being exploited at least once; otherwise it determines there is a low likelihood of exploitation.

In some embodiments, the predictive model 111 may be configured to generate the vulnerability risk score by identifying a second vulnerability that co-exists on a client device 102 in the computing environment along with a first vulnerability, and determining a likelihood of the vulnerability and the second vulnerability being exploited together in the attack. For example, the VRPS agent 109 may be configured to determine that a first vulnerability and a second vulnerability exist on the client device **102*a*. The predictive model 111 may use CVE chain dataset (which is a part of the input dataset) to determine if there is a likelihood for the first vulnerability and the second vulnerability to be used together in an attack. In some embodiments, the predictive model 111** determine that there is a high likelihood for the first vulnerability and the second vulnerability to be used together in an attack, even if there is a low likelihood for the first vulnerability to be used by itself in an attack and the second vulnerability to be used by itself in an attack.

In some embodiments, the predictive model 111 may be configured to generate the vulnerability risk score by determining a capability of a computing environment to defend against the vulnerability being exploited in the attack, and adjusting the likelihood of the vulnerability being exploited in an attack based on the capability of the computing environment to defend against the vulnerability being exploited in the attack. For example, the input dataset may include the risk reduction capability data (retrieved from LOU database 107) that is associated with the client device **102*a* and the vulnerability may be associated with the application 112*a* executing on the client device 102*a*. If the predictive model 111 determines, based on the risk reduction capability data, that the client device 102*a* has a particular anti-virus software (e.g., a particular brand, a particular version of the particular brand, a particular database version) having a particular detection capability (e.g., static signature-based detection, EDR detection, NGAV detection) that can defend against attacks that exploit the vulnerability, then the predictive model 111** determines that there is a low likelihood of the vulnerability being exploited at least once; otherwise it determines there is a high likelihood of exploitation.

In some embodiments, the predictive model 111 may be configured to generate the vulnerability risk score by determining a likelihood of the vulnerability being exploited in an attack based on an industry type associated with the client or a geographic location associated with the client. For example, the input dataset may include the client attributes that are associated with the client device **102*a* and the vulnerability may be associated with the application 112*a* executing on the client device 102*a*, where the client device 102*a* is associated with a technology corporation. If the predictive model 111 determines, based on the client attributes, that the client device 102*a* is associated with the technology industry and that the technology industry has a history of the vulnerability being exploited in an attack, then the predictive model 111** determines that there is a high likelihood of the vulnerability being exploited at least once; otherwise it determines there is a low likelihood of exploitation.

In some embodiments, the predictive model 111 may be configured to generate the vulnerability risk score by determining a likelihood of the vulnerability being exploited in the attack based on prior attacks observed in the computing environment. In some embodiments, the predictive model 111 may be configured to generate the vulnerability risk score by receiving the EDR data from the client device 102, wherein the vulnerability in the computing environment exists on the client device; and calculating, based on the EDR data, a frequency in which the vulnerability might be exploited in the attack.

The VRP 104 includes a network interface 206*a* configured to establish a communication session with a computing device for sending and receiving data over the communication network 120 to the computing device. Accordingly, the network interface 206A includes a cellular transceiver (supporting cellular standards), a local wireless network transceiver (supporting 802.11X, ZigBee®, Bluetooth®, Wi-Fi, or the like), a wired network interface, a combination thereof (e.g., both a cellular transceiver and a Bluetooth transceiver), and/or the like. In some embodiments, the VRP system 104 includes a plurality of network interfaces 206*a* of different types, allowing for connections to a variety of networks, such as local area networks (public or private) or wide area networks including the Internet, via different sub-networks.

The VRP system 104 includes an input/output device 205*a* configured to receive user input from and provide information to a user. In this regard, the input/output device 205*a* is structured to exchange data, communications, instructions, etc. with an input/output component of the VRP system 104. Accordingly, input/output device 205*a* may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of VRP system 104, such as a built-in display, touch screen, microphone, etc., or external to the housing of VRP system 104, such as a monitor connected to VRP system 104, a speaker connected to VRP system 104, etc., according to various embodiments. In some embodiments, the VRP system 104 includes communication circuitry for facilitating the exchange of data, values, messages, and the like between the input/output device 205*a* and the components of the VRP system 104. In some embodiments, the input/output device 205*a* includes machine-readable media for facilitating the exchange of information between the input/output device 205*a* and the components of the VRP system 104. In still another embodiment, the input/output device 205*a* includes any combination of hardware components (e.g., a touchscreen), communication circuitry, and machine-readable media.

The VRP system 104 includes a device identification component 207*a* (shown in FIG. 2A as device ID component 207*a*) configured to generate and/or manage a device identifier associated with the VRP system 104. The device identifier may include any type and form of identification used to distinguish the VRP system 104 from other computing devices. In some embodiments, to preserve privacy, the device identifier may be cryptographically generated, encrypted, or otherwise obfuscated by any device and/or component of VRP system 104. In some embodiments, the VRP system 104 may include the device identifier in any communication (e.g., remedial action messages, etc.) that the VRP system 104 sends to a computing device.

The VRP system 104 includes a bus (not shown), such as an address/data bus or other communication mechanism for communicating information, which interconnects the devices and/or components of VRP system 104, such as processing device 202*a*, network interface 206*a*, input/output device 205*a*, and device ID component 207*a*.

In some embodiments, some or all of the devices and/or components of VRP system 104 may be implemented with the processing device 202*a*. For example, the VRP system 104 may be implemented as a software application stored within the memory 204*a* and executed by the processing device 202*a*. Accordingly, such embodiment can be implemented with minimal or no additional hardware costs. In some embodiments, any of these above-recited devices and/or components rely on dedicated hardware specifically configured for performing operations of the devices and/or components.

Figure 2B:
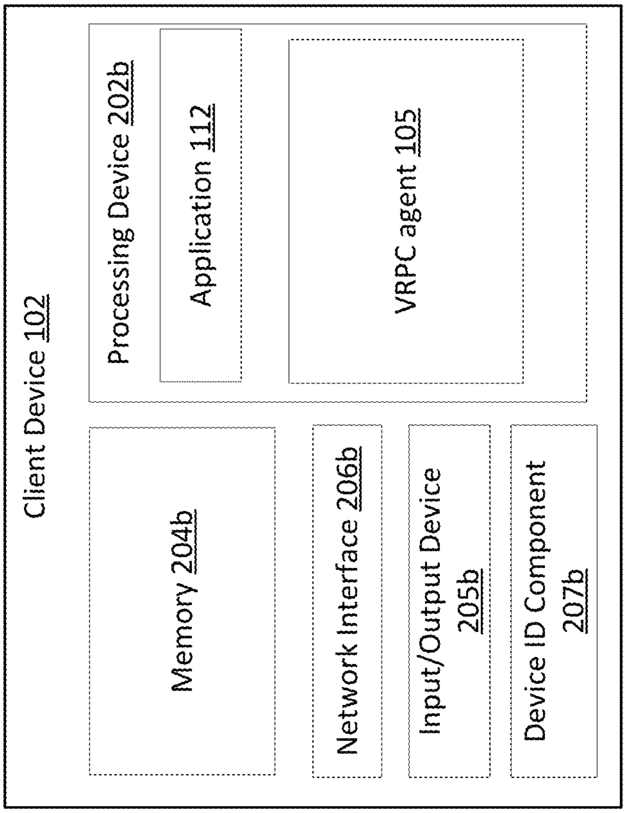
FIG. 2B is a block diagram depicting an example of the client device 102 of the environment in FIG. 1, according to some embodiments.

FIG. 2B is a block diagram depicting an example of the client device 102 of the environment in FIG. 1, according to some embodiments. While various devices, interfaces, and logic with particular functionality are shown, it should be understood that the client device 102 includes any number of devices and/or components, interfaces, and logic for facilitating the functions described herein. For example, the activities of multiple devices may be combined as a single device and implemented on a same processing device (e.g., processing device 202*b*), as additional devices and/or components with additional functionality are included.

The client device 102 includes a processing device 202*b* (e.g., general purpose processor, a PLD, etc.), which may be composed of one or more processors, and a memory 204*b* (e.g., synchronous dynamic random access memory (DRAM), read-only memory (ROM)), which may communicate with each other via a bus (not shown). The processing device 202*b* includes identical or nearly identical functionality as processing device 202*a* in FIG. 2*a*, but with respect to devices and/or components of the client device 102 instead of devices and/or components of the VRP system 104.

The memory 204*b* of processing device 202*b* stores data and/or computer instructions/code for facilitating at least some of the various processes described herein. The memory 204*b* includes identical or nearly identical functionality as memory 204*a* in FIG. 2A, but with respect to devices and/or components of the client device 102 instead of devices and/or components of the VRP system 104.

The processing device 202*b* may include and/or execute an application 112 (e.g., application 112*a*, application 112*b*) that is displayed on a computer screen of the client device 102. The application 112 may be any type of application, such as an operating system, a software driver for hardware (e.g., memory, video, motherboard), an internet/web browser, a graphic user interface (GUI), an email reader/client, a File Transfer Protocol (FTP) client, a virtual machine application, a desk-sharing application (e.g., configured in a server-mode or a client-mode), or a software application that is separate from an internet/web browser. The application 112 may be a particular brand (e.g., Microsoft®, etc.), a particular version of the particular brand (MS Windows 10.2), include a particular service pack (Service Pack 1 for MS Windows 10), and/or rely on a particular database/library version. In some embodiments, the application 112 may be a container image, which is a standalone and executable package of software that includes everything (e.g., code, runtime, system tools, system libraries and settings) needed to run an application.

The processing device 202*b* may be configured to execute the vulnerability risk prediction client (VRPC) agent 105. The VRPC agent 105 may be configured to gather the environment variables associated with the client device 102 from its memory (e.g., memory 204*b*) and local storage. For example, the client device 102 may gather information that describes the software (e.g., type, brand, specifications, amount of available resources, amount of resources being used, version, service pack info, etc.) that is executing on its hardware, including the details of its hardware. The client device 102 may also gather information that describes the network connections that are maintained by the client device 102*a*. The VRPC agent 105 may package up the gathered information (e.g., environment variables) and send a message to the VRP system 104 that includes the environment variables. The VRPC agent 105 may send the environmental variables periodically or whenever new information is gathered by the VRPC agent 105. In some embodiments, the VRPC agent 105 may send its EDR data that is gathered by its local anti-virus software to the VRP system 104.

The VRPC agent 105 may be configured to receive a message (e.g., first remedial message, second remedial message) from the VRP system 104, where the message indicates the risk score and/or the one or more remedial actions that should be taken to resolve or mitigate the vulnerability. In some embodiments, the message may include instructions that cause the VRPC agent 105 to install software updates that resolve or mitigate the vulnerability. The VRPC agent 105 may be configured to display the risk score and/or the one or more remedial actions on a computer display.

The client device 102 includes a network interface 206*b* configured to establish a communication session with a computing device for sending and receiving data over a network to the computing device. Accordingly, the network interface 206*b* includes identical or nearly identical functionality as network interface 206*a* in FIG. 2A, but with respect to devices and/or components of the client device 102 instead of devices and/or components of the VRP system 104.

The client device 102 includes an input/output device 205*b* configured to receive user input from and provide information to a user. In this regard, the input/output device 205*b* is structured to exchange data, communications, instructions, etc. with an input/output component of the client device 102. The input/output device 205*b* includes identical or nearly identical functionality as input/output device 205*a* in FIG. 2A, but with respect to devices and/or components of the client device 102 instead of devices and/or components of the VRP system 104.

The client device 102 includes a device identification component 207*b* (shown in FIG. 2B as device ID component 207*b*) configured to generate and/or manage a device identifier associated with the client device 102. The device ID component 207*b* includes identical or nearly identical functionality as device ID component 207*a* in FIG. 2A, but with respect to devices and/or components of the client device 102 instead of devices and/or components of the VRP system 104.

The client device 102 includes a bus (not shown), such as an address/data bus or other communication mechanism for communicating information, which interconnects the devices and/or components of the client device 102, such as processing device 202*b*, network interface 206*b*, input/output device 205*b*, and device ID component 207*b*.

In some embodiments, some or all of the devices and/or components of client device 102 may be implemented with the processing device 202*b*. For example, the client device 102 may be implemented as a software application stored within the memory 204*b* and executed by the processing device 202*b*. Accordingly, such embodiment can be implemented with minimal or no additional hardware costs. In some embodiments, any of these above-recited devices and/or components rely on dedicated hardware specifically configured for performing operations of the devices and/or components.

Figure 3:
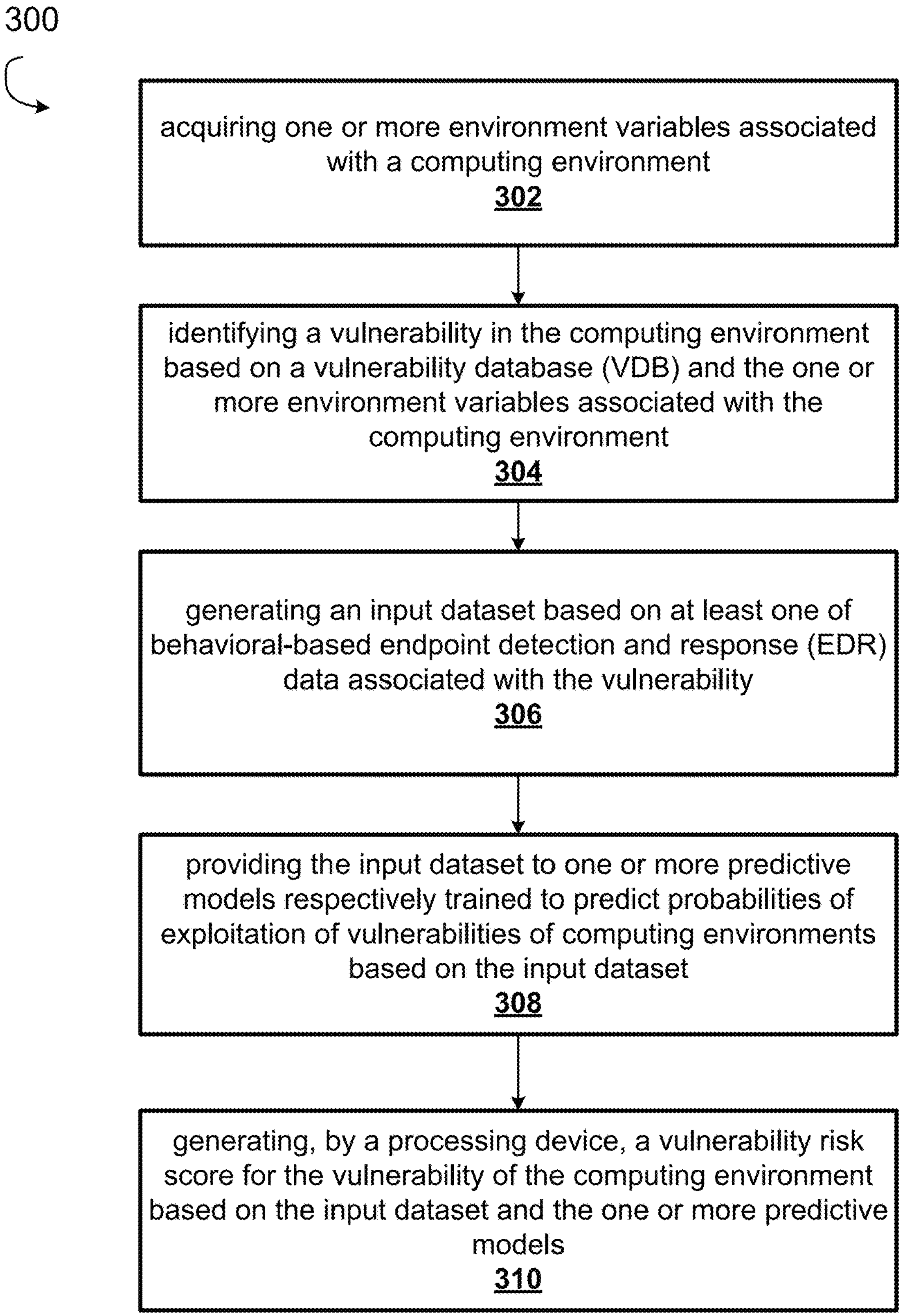
FIG. 3 is a flow diagram depicting a method for predicting the probability of exploitation of vulnerabilities of a computing environment using machine learning, according to some embodiments.

FIG. 3 is a flow diagram depicting a method for predicting the probability of exploitation of vulnerabilities of a computing environment using machine learning, according to some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 300 may be performed by a vulnerability risk prediction (VRP) system, such as VRP system 104 in FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

As shown in FIG. 3, the method 300 includes the block 302 of acquiring one or more environment variables associated with a computing environment. The method 300 includes the block 304 of identifying a vulnerability in the computing environment based on a vulnerability database (VDB) and the one or more environment variables associated with the computing environment. The method 300 includes the block 306 of generating an input dataset based on behavioral-based endpoint detection and response (EDR) data associated with the vulnerability. The method 300 includes the block 308 of providing the input dataset to one or more predictive models respectively trained to predict probabilities of exploitation of vulnerabilities of computing environments based on the input dataset. The method 300 includes the block of 310 of generating, by a processing device, a vulnerability risk score for the vulnerability of the computing environment based on the input dataset and the one or more predictive models.

Figure 4:
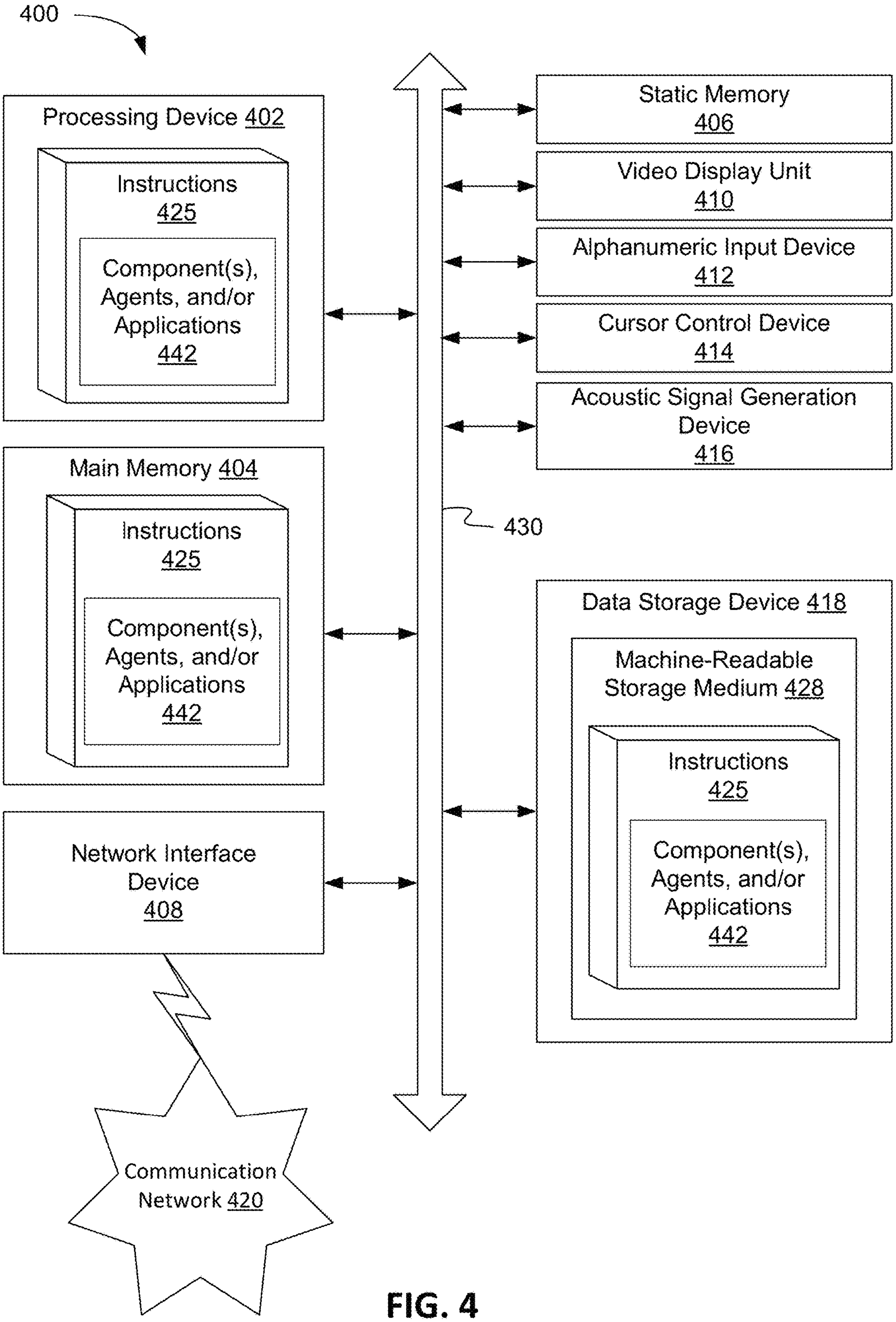
FIG. 4 is a block diagram of an example computing device 400 that may perform one or more of the operations described herein, in accordance with some embodiments.

FIG. 4 is a block diagram of an example computing device 400 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also comprise one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein.

Computing device 400 may further include a network interface device 408 which may communicate with a communication network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions 425 that may include instructions for one or more components 142 (e.g., VRPS agent 109 in FIG. 2A, VRPC agent 105 in FIG. 2B) for carrying out the operations described herein, in accordance with one or more aspects of the present disclosure. Instructions 425 may also reside, completely or at least partially, within main memory 404 and/or within processing device 402 during execution thereof by computing device 400, main memory 404 and processing device 402 also constituting computer-readable media. The instructions 425 may further be transmitted or received over a communication network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "acquiring," "identifying," "generating," "providing," "generating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:

acquiring one or more environment variables associated with a computing environment;

identifying a vulnerability in the computing environment based on a vulnerability database (VDB) and the one or more environment variables associated with the computing environment;

generating an input dataset based on behavioral-based endpoint detection and response (EDR) data associated with the vulnerability;

applying one or more predictive models, respectively trained to predict probabilities of exploitation of vulnerabilities of computing environments, to the input dataset;

generating, by one or more processors, a vulnerability risk score for the vulnerability of the computing environment based on the input dataset and the one or more predictive models, wherein generating the vulnerability risk score further comprises determining a likelihood of the vulnerability being exploited in an attack based on application attributes of an application associated with the vulnerability and vulnerability attributes of the vulnerability in the computing environment, wherein generating the vulnerability risk score further comprises identifying a second vulnerability that co-exists on a client device with the vulnerability and determining a likelihood that a combination of the vulnerability and the second vulnerability being exploited together in the attack, wherein determining the likelihood that the combination of the vulnerability and the second vulnerability is exploited together in the attack comprises evaluating one or more CVE chain datasets derived from the EDR data, each CVE chain dataset indicating an empirically observed frequency with which the vulnerability and the second vulnerability have been exploited together across a plurality of computing environments, the empirically observed frequency being normalized using the application attributes that comprise prevalence data indicating whether the application is prevalent among a plurality of computing devices in the computing environment, wherein the vulnerability attributes are indicative of a vulnerability age indicating when the vulnerability initially appeared in other computing environments prior to being identified in the computing environment and a usefulness score associated with the vulnerability being exploited in the attack, wherein determining the likelihood of the vulnerability further comprises determining a probability for user privileges in the computing environment to be escalated if the vulnerability was exploited; and prioritizing a repair of the vulnerability based on the vulnerability risk score to minimize computing resource consumption by the vulnerability.

2. The method of claim 1, wherein determining the likelihood of the vulnerability being exploited in the attack is further based on at least one or more historical CVE attributes of the vulnerability in the computing environment.

3. The method of claim 2, wherein the application attributes comprise an attack history of the application.

4. The method of claim 2, wherein the vulnerability attributes of the vulnerability in the computing environment are further indicative of a weakness category associated with the vulnerability being exploited in the attack.

5. The method of claim 2, wherein the EDR data is associated with the plurality of computing environments, and wherein generating the vulnerability risk score further comprising:

calculating, based on the EDR data, a frequency in which the vulnerability might be exploited.

6. The method of claim 2, wherein the vulnerability in the computing environment exists on the client device.

7. The method of claim 2, wherein generating the vulnerability risk score further comprising:

determining a capability of the client device to defend against the vulnerability being exploited in the attack, the vulnerability in the computing environment exists on the client device; and adjusting the likelihood of the vulnerability being exploited in the attack based on the capability of the client device to defend against the vulnerability being exploited in the attack.

8. The method of claim 2, wherein the computing environment is associated with the client device, wherein generating the vulnerability risk score further comprising:

determining the likelihood of the vulnerability being exploited in the attack based on an industry type associated with the client device or a geographic location associated with the client device.

9. The method of claim 2, wherein generating the vulnerability risk score further comprising:

determining the likelihood of the vulnerability being exploited in the attack based on prior attacks observed in the computing environment, or receiving the EDR data from the client device, wherein the vulnerability in the computing environment exists on the client device; and calculating, based on the EDR data, a frequency in which the vulnerability might be exploited in the attack.

10. The method of claim 1, further comprising:

prioritizing the vulnerability over other vulnerabilities that are associated with the computing environment based on the vulnerability risk score; and providing a notification indicating one or more remedial actions to resolve the vulnerability responsive to prioritizing the vulnerability.

11. A system comprising:

a memory; and one or more processors, operatively coupled to the memory, to:

acquire one or more environment variables associated with a computing environment;

identify a vulnerability in the computing environment based on a vulnerability database (VDB) and the one or more environment variables associated with the computing environment;

generate an input dataset based on at least one of behavioral-based endpoint detection and response (EDR) data associated with the vulnerability;

apply one or more predictive models, respectively trained to predict probabilities of exploitation of vulnerabilities of computing environments, to the input dataset;

generate a vulnerability risk score for the vulnerability of the computing environment based on the input dataset and the one or more predictive models, wherein generating the vulnerability risk score further comprises determining a likelihood of the vulnerability being exploited in an attack based on application attributes of an application associated with the vulnerability and vulnerability attributes of the vulnerability in the computing environment and a usefulness score associated with the vulnerability being exploited in the attack, wherein to generate the vulnerability risk score further comprises identifying a second vulnerability that co-exists on a client device with the vulnerability and determining a likelihood that a combination of the vulnerability and the second vulnerability is being exploited together in the attack, wherein determining the likelihood that the combination of the vulnerability and the second vulnerability is exploited together in the attack comprises evaluating one or more CVE chain datasets derived from the EDR data, each CVE chain dataset indicating an empirically observed frequency with which the vulnerability and the second vulnerability have been exploited together across a plurality of computing environments, the empirically observed frequency being normalized using the application attributes that comprise prevalence data indicating whether the application is prevalent among a plurality of computing devices in the computing environment, wherein determining the likelihood of the vulnerability further comprises determining, based on the usefulness score, a probability for user privileges in the computing environment to be escalated if the vulnerability was exploited, wherein the vulnerability attributes are indicative of a vulnerability age indicating when the vulnerability initially appeared in other computing environments prior to being identified in the computing environment; and prioritize a repair of the vulnerability based on the vulnerability risk score to minimize computing resource consumption by the vulnerability.

12. The system of claim 11, wherein to determine the likelihood of the vulnerability being exploited in the attack is further based on at least one or more historical CVE attributes of the vulnerability in the computing environment.

13. The system of claim 12, wherein the application attributes comprise an attack history of the application.

14. The system of claim 12, wherein the vulnerability attributes of the vulnerability in the computing environment are further indicative of a weakness category associated with the vulnerability being exploited in the attack.

15. The system of claim 12, wherein the EDR data is associated with the plurality of computing environments, and wherein to generate the vulnerability risk score, the one or more processors to:

calculate, based on the EDR data, a frequency in which the vulnerability might be exploited in the attack.

16. The system of claim 12, wherein the vulnerability in the computing environment exists on the client device.

17. The system of claim 12, wherein the vulnerability in the computing environment exists on the client device, and wherein to generate the vulnerability risk score, the one or more processors to:

determine a capability of the client device to defend against the vulnerability being exploited in the attack; and adjust the likelihood of the vulnerability being exploited in the attack based on the capability of the client device to defend against the vulnerability being exploited in the attack.

18. The system of claim 12, wherein the computing environment is associated with a client, wherein to generate the vulnerability risk score, the one or more processors to:

determine the likelihood of the vulnerability being exploited in the attack based on an industry type associated with the client or a geographic location associated with the client.

19. The system of claim 12, wherein to generate the vulnerability risk score, the one or more processors to:

determine the likelihood of the vulnerability being exploited in the attack based on prior attacks observed in the computing environment, or receive the EDR data from the client device, wherein the vulnerability in the computing environment exists on the client device; and calculate, based on the EDR data, a frequency in which the vulnerability might be exploited in the attack.

20. A non-transitory computer-readable medium storing instructions that, when executed by one or more processors, cause the one or more processors to:

acquire one or more environment variables associated with a computing environment;

identify a vulnerability in the computing environment based on a vulnerability database (VDB) and the one or more environment variables associated with the computing environment;

generate an input dataset based on at least one of behavioral-based endpoint detection and response (EDR) data associated with the vulnerability;

apply one or more predictive models, respectively trained to predict probabilities of exploitation of vulnerabilities of computing environments, to the input dataset;

generate, by the one or more processors, a vulnerability risk score for the vulnerability of the computing environment based on the input dataset and the one or more predictive models, wherein to generate the vulnerability risk score, the one or more processors are further to determine a likelihood of the vulnerability being exploited in an attack based on application attributes of an application associated with the vulnerability and vulnerability attributes of the vulnerability in the computing environment and a usefulness score associated with the vulnerability being exploited in the attack, wherein generating the vulnerability risk score further comprises identifying a second vulnerability that co-exists on a client device with the vulnerability and determining a likelihood that a combination of the vulnerability and the second vulnerability is being exploited together in the attack, wherein determining the likelihood that the combination of the vulnerability and the second vulnerability is exploited together in the attack comprises evaluating one or more CVE chain datasets derived from the EDR data, each CVE chain dataset indicating an empirically observed frequency with which the vulnerability and the second vulnerability have been exploited together across a plurality of computing environments, the empirically observed frequency being normalized using the application attributes that comprise prevalence data indicating whether the application is prevalent among a plurality of computing devices in the computing environment, wherein determining the likelihood of the vulnerability further comprises determining, based on the usefulness score, a probability for user privileges in the computing environment to be escalated if the vulnerability was exploited, wherein the vulnerability attributes are indicative of a vulnerability age indicating when the vulnerability initially appeared in other computing environments prior to being identified in the computing environment; and prioritize a repair of the vulnerability based on the vulnerability risk score to minimize computing resource consumption by the vulnerability.

* * * * *